(12) United States Patent
Pinkerton et al.

(10) Patent No.: US 7,590,755 B2
(45) Date of Patent: *Sep. 15, 2009

(54) METHOD TO OFFLOAD A NETWORK STACK

(75) Inventors: James Pinkerton, Sammamish, WA (US); Abolade Gbadegesin, Seattle, WA (US); Sanjay Kaniyar, Redmond, WA (US); Nelamangala Krishaswamy Srinivas, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

This patent is subject to a terminal disclaimer.

(21) Appl. No.: 11/002,869

(22) Filed: Dec. 2, 2004

(65) Prior Publication Data

US 2005/0091412 A1 Apr. 28, 2005

Related U.S. Application Data

(63) Continuation-in-part of application No. 10/135,489, filed on Apr. 30, 2002, now Pat. No. 7,007,103.

(51) Int. Cl.
*G06F 15/16* (2006.01)
(52) U.S. Cl. .................................. 709/238; 709/230
(58) Field of Classification Search .................. 709/230, 709/238
See application file for complete search history.

(56) References Cited

U.S. PATENT DOCUMENTS 5,937,169 A * 8/1999 Connery et al. ............. 709/250
6,094,712 A * 7/2000 Follett et al. ................ 711/203
6,141,705 A 10/2000 Anand et al.
6,226,680 B1 5/2001 Boucher et al.

(Continued)

FOREIGN PATENT DOCUMENTS

WO WO 99/65219 12/1999

(Continued)

OTHER PUBLICATIONS

Westrelin, R.; Fugier, N.; Nordmark, E.; Kunze, K.; Lemoine, E., "Studying network protocol offload with emulation: approach and preliminary results," High Performance Interconnects, 2004. Proceedings. 12th Annual IEEE Symposium on, vol., No., pp. 84-90, Aug. 25-27, 2004.*

(Continued)

*Primary Examiner*—Larry D Donaghue
*Assistant Examiner*—Ajay Bhatia
(74) *Attorney, Agent, or Firm*—Wolf, Greenfield & Sacks, P.C.

(57) ABSTRACT

A method to offload a network stack connection is presented. A request, which includes a list of resource requirements from each software layer in the stack, to offload the network stack connection is sent through the stack to the peripheral device. The peripheral device is a second processor that processes the offloaded network stack connection in software, in hardware, or a mixture of hardware and software. The device allocates resources for the list and sends a handle to each of the software layers for communication with the device. The state for each layer is sent to the device that includes state variables that are classified as a constant, a cached variable handled by the CPU, or a delegated variable handled by the device.

29 Claims, 7 Drawing Sheets

U.S. PATENT DOCUMENTS

| | | | |
|---|---|---|---|
| 6,247,060 | B1 | 6/2001 | Boucher et al. |
| 6,334,153 | B2 | 12/2001 | Boucher et al. |
| 6,393,487 | B2 | 5/2002 | Boucher et al. |
| 6,434,620 | B1* | 8/2002 | Boucher et al. ............. 709/230 |
| 6,751,665 | B2* | 6/2004 | Philbrick et al. ............ 709/224 |
| 6,757,746 | B2 | 6/2004 | Boucher et al. |
| 6,938,092 | B2* | 8/2005 | Burns ......................... 709/230 |
| 7,007,103 | B2* | 2/2006 | Pinkerton et al. ............ 709/238 |
| 7,167,926 | B1* | 1/2007 | Boucher et al. ............. 709/250 |
| 2001/0021949 | A1 | 9/2001 | Blightman et al. |
| 2004/0003126 | A1* | 1/2004 | Boucher et al. ............. 709/250 |
| 2004/0064590 | A1* | 4/2004 | Starr et al. .................. 709/250 |
| 2004/0078480 | A1* | 4/2004 | Boucher et al. ............. 709/237 |
| 2004/0158640 | A1* | 8/2004 | Philbrick et al. ............ 709/230 |
| 2004/0199808 | A1* | 10/2004 | Freimuth et al. ................ 714/4 |
| 2004/0249881 | A1* | 12/2004 | Jha et al. .................... 709/200 |
| 2006/0069792 | A1* | 3/2006 | Pinkerton et al. ............ 709/230 |
| 2006/0251120 | A1* | 11/2006 | Arimilli et al. .............. 370/469 |
| 2007/0076623 | A1* | 4/2007 | Aloni et al. .................. 370/252 |

FOREIGN PATENT DOCUMENTS

WO      WO 02/27519 A1      4/2002

OTHER PUBLICATIONS

Dong-Jae Kang; Chei-Yol Kim; Kang-Ho Kim; Sung-In Jung, "Design and implementation of kernel S/W for TCP/IP offload engine(TOE)," Advanced Communication Technology, 2005, ICACT 2005. The 7th International Conference on , vol. 1, No., pp. 706-709, Jul. 11, 2005.*

"The Layered Approach: The OSI Model", Data and Computer Communications, 1991, pp. 446-456.

* cited by examiner

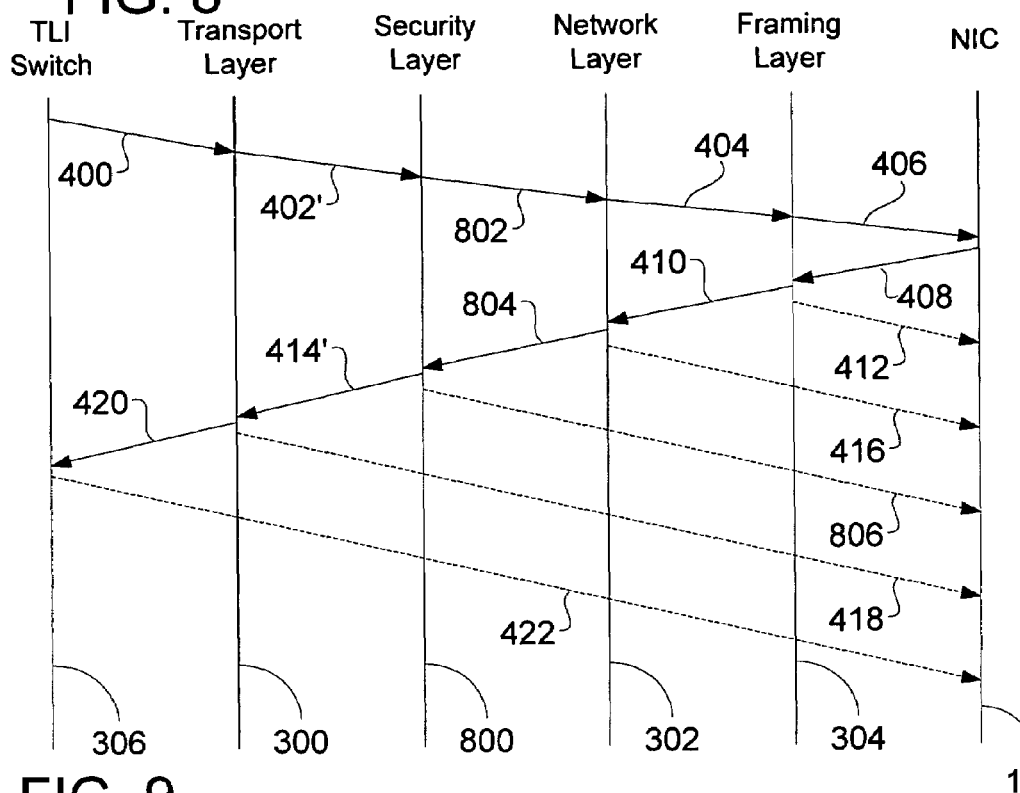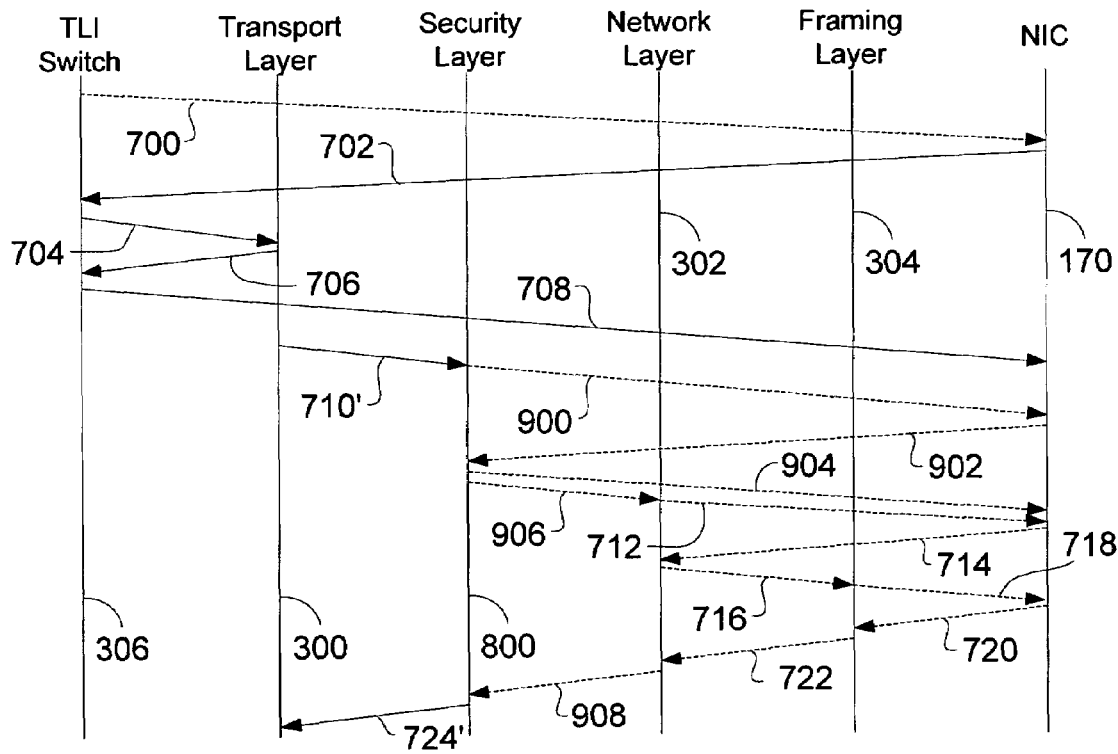

METHOD TO OFFLOAD A NETWORK STACK

CROSS-REFERENCE TO RELATED PATENT APPLICATIONS

This patent application is a continuation-in-part of copending U.S. patent application Ser. No. 10/135,489, filed Apr. 30, 2002, and hereby incorporated in its entirety.

FIELD OF THE INVENTION

This invention relates generally to methods for increasing the efficiency, speed, and/or throughput of a computer system and, more particularly, relates to methods for offloading computing tasks typically performed by a host processor to a specific hardware component.

BACKGROUND OF THE INVENTION

The complexity and sophistication of operating systems, application software, networking, networked communications, and the like continue to increase at dramatic rates. One result of the complexity and sophistication is increased functionality of applications and systems. This increased functionality often results in an increase in CPU overhead due to the additional duties that must be performed by the CPU to execute the increased system and application functions.

One area where the increase in CPU overhead is readily apparent is in the area of networked applications where network speeds are increasing due to the growth in high bandwidth media. Network speeds often match, and increasingly exceed, the CPU processor speed and memory bandwidth capabilities of the host computers. These networked applications further burden the host processor due to the layered architecture used by most operating systems, such as the seven-layer ISO model or the layered model used by the Windows operating system. As is well known, such a model is used to describe the flow of data between the physical connection to the network and the end-user application. The most basic functions, such as putting data bits onto the network cable, are performed at the bottom layers, while functions attending to the details of applications are at the top layers. Essentially, the purpose of each layer is to provide services to the next higher layer, shielding the higher layer from the details of how services are actually implemented. The layers are abstracted in such a way that each layer believes it is communicating with the same layer on the other computer.

Various functions that are performed on a data packet as it proceeds between layers can be software intensive, and often requires a substantial amount of CPU processor and memory resources. For instance, certain functions that are performed on the packet at various layers are extremely CPU intensive, such as packet checksum calculation and verification, encryption and decryption of data (e.g., SSL encryption and IP Security encryption), message digest calculation, TCP segmentation, TCP retransmission and acknowledgment (ACK) processing, packet filtering to guard against denial of service attacks, and User Datagram Protocol (UDP) packet fragmentation. As each of these functions is performed, the resulting demands on the CPU can greatly affect the throughput and performance of the overall computer system.

Although the demand on CPU resources grows, the capability and throughput of computer hardware peripherals such as network interface cards (NICs) and the like are also increasing. These peripherals are often equipped with a dedicated processor and memory that are capable of performing many of the tasks and functions that are otherwise performed by the CPU.

The computer industry recognized this capability and developed methods to offload CPU intensive tasks and functions that were previously performed by the CPU. For example, the commonly assigned U.S. Pat. No. 6,141,705 to Anand et al., and patent application Ser. No. 09/657,510, "Method and Computer Program Product for Offloading Processing Tasks from Software to Hardware," filed Sep. 7, 2000, and Ser. No. 09/726,082, "Method and Computer Program Product for Offloading Processing Tasks from Software to Hardware," filed Nov. 29, 2000 provide solutions to query peripheral devices and offload specific processor tasks to the peripheral devices that are capable of performing the intensive tasks and functions. The specific tasks typically offloaded include tasks such as TCP (Transmission Control Protocol) and or IP (Internet Protocol) checksum computation, TCP segmentation such as large send offload (LSO), and secure Internet protocol (IPSEC) encryption and decryption.

These offload mechanisms are limited in that the mechanisms have a secondary requirement that a minimum number of changes be made to the network stack. As a result of this secondary requirement, another limitation is that the offloads have a long code path because the entire network stack is traversed with the offloaded tasks and functions disabled to reach the peripheral device. A further limitation is the lack of integration with the network stack. There is no well defined interface for the network stack to query or set parameters on the peripheral device or an interface for the peripheral device to inform the network stack of any notifications or changes of capabilities. For example, if the route changes when an LSO request is being processed, the fallback mechanism is for the stack to wait for timeouts and retransmit the LSO request.

Another approach that peripheral device manufacturers tried to do was to offload the entire TCP connection from the core stack to a network interface card (NIC). This approach bypasses the entire protocol stack by using a proprietary interface and requires the peripheral device to handle all TCP messages, IP (Internet Protocol) messages, ICMP (Internet Control Message Protocol) messages, DNS (Domain Name Server) messages, and RIP messages, requiring the NIC to process everything. Additionally, this approach does not address multi-homed environments and does not cleanly integrate with the host operating system network management utilities. Once a state changes, the offloaded connection can easily fail.

BRIEF SUMMARY OF THE INVENTION

The present invention provides a method to offload a network stack connection, such as a TCP based protocol stack. Data that would normally be sent through a NDIS (network driver interface specification) path that has multiple software layers to a peripheral device is offloaded to a path from a switch layer to the peripheral device. Tight synchronization with the network stack and processing unit is maintained. A request to offload the stack is sent through the NDIS path to the peripheral device. The request includes a list of resource requirements so that the peripheral device has the information needed to allocate resources. Each layer in the NDIS path adds its resource requirements to the list. If the peripheral device accepts the request, the peripheral device allocates resources and sends an offload handle to each of the software layers so that the software layers can communicate with the peripheral device.

The state for each software layer is sent to the peripheral device once the peripheral device's acceptance of the offload is communicated to the software layer. Alternatively, the state is sent with the offload request and only changes to the state are sent to the peripheral device. Each state has state variables and each state variable is classified as a constant variable, a cached variable, or a delegated variable. The constant variables do not change during the time the protocol stack is offloaded. Cached variables are handled by the CPU and delegated variables are handled by the peripheral device.

The present invention also provides a method to upload an offloaded network connection from the peripheral device to the host. The upload is initiated by either the peripheral device or the switch layer. Once the upload is initiated, the peripheral device completes all outstanding requests and hands the delegated state to the switch layer. After the delegated state has been accepted by the host, the state resources at the peripheral device are freed.

During offload or upload transfers, an update (e.g., ARP update or RIP update) could arrive. A sequence number is used to ensure that the most recent update message is used if multiple update messages are received by the peripheral device so that the peripheral device does not use stale data.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 8 is a ladder diagram illustrating the offload mechanism of a secure protocol stack connection in accordance with the teachings of the present invention; and FIG. 9 is a ladder diagram illustrating the upload mechanism of a secure offloaded protocol stack connection in accordance with the teachings of the present invention.

DETAILED DESCRIPTION OF THE INVENTION

Figure 1:
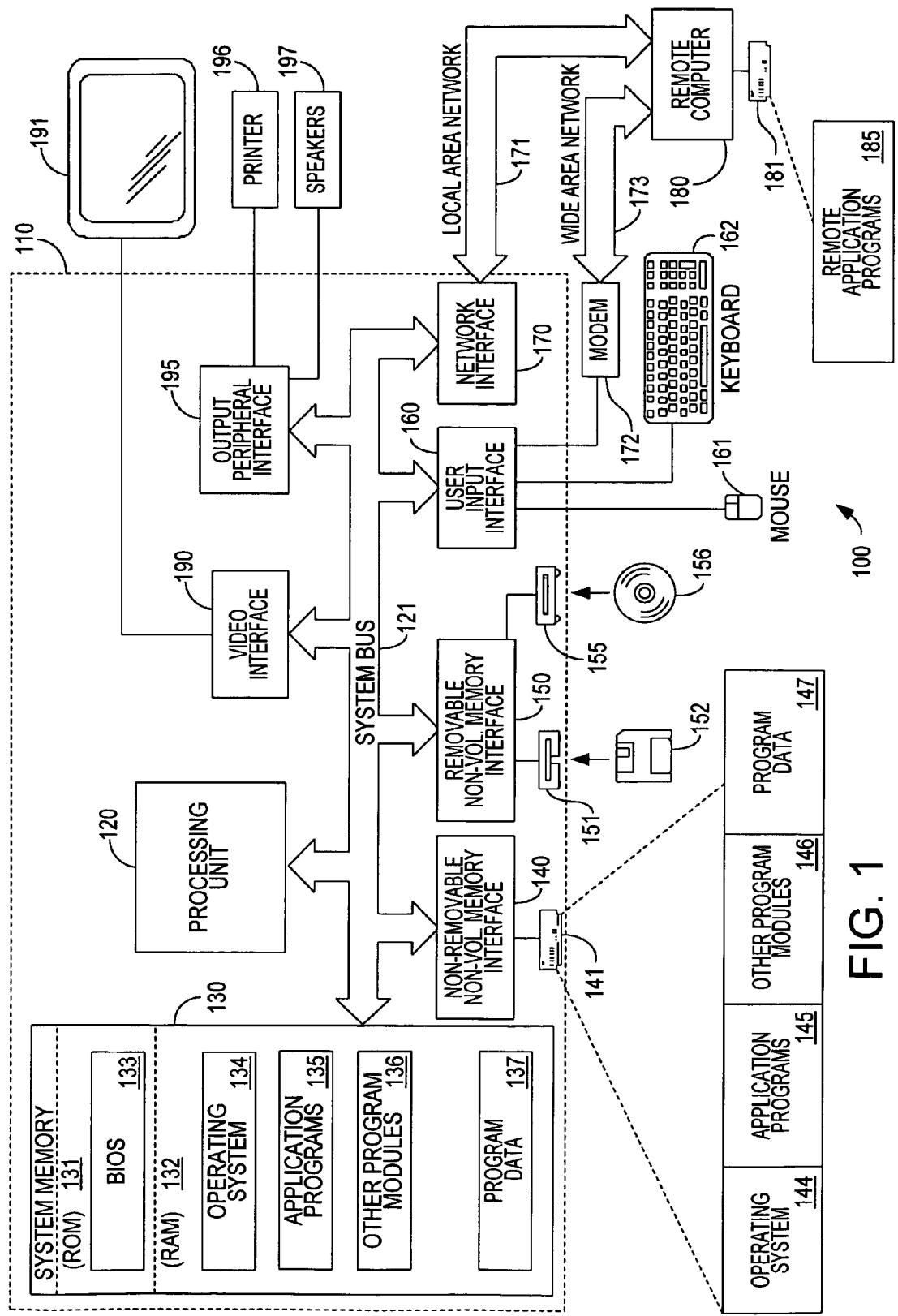
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, networked peripherals (e.g., networked printers) and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, networked peripherals (e.g., networked printers), distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may have a single processor or multiple processors. The system bus 121 may be any of several types of bus structures including a memory bus or memory controller, a peripheral bus, a cross-bar, a switched bus fabric, and a local bus using any of a variety of bus architectures. The system bus 121 may also be a hierarchy of buses. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, No Cache Non-Uniform Memory Access (NC-NUMA) architecture bus, Cache-Coherent Non-Uniform Memory Access (CC-NUMA) architecture bus and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, video input, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197, printer 196, and a video output, which may be connected through an output peripheral interface 195.

The computer 110 may operate in a networked environment using logical connections to one or more remote computers, such as a remote computer 180. The remote computer 180 may be another personal computer, a server, a router, a network peripheral device (e.g., a printer), a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter (e.g., a network interface card (NIC)) 170. While represented as a single box, the network interface 170 has multiple instantiations and can be implemented in a variety of ways. One way is that there is a processing module having one or more processors that is connected directly to the system bus with a network interface card connected directly to the system bus with the processing unit and network interface card communicating with each other across the system bus. The processing module processes the offloaded network stack operations as described below in software, in hardware, or a mix of software and hardware. The processing module may be in a separate interface card, part of a motherboard, in an internal or external card, another processor in a multiple processor unit, and the like. Another way is to embed the functionality of the processing module in a peripheral device, such as, for example, a network interface card, that processes the offloaded network stack operations as described below in software, in hardware, or a mix of software and hardware. The peripheral device may have one or more processors. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
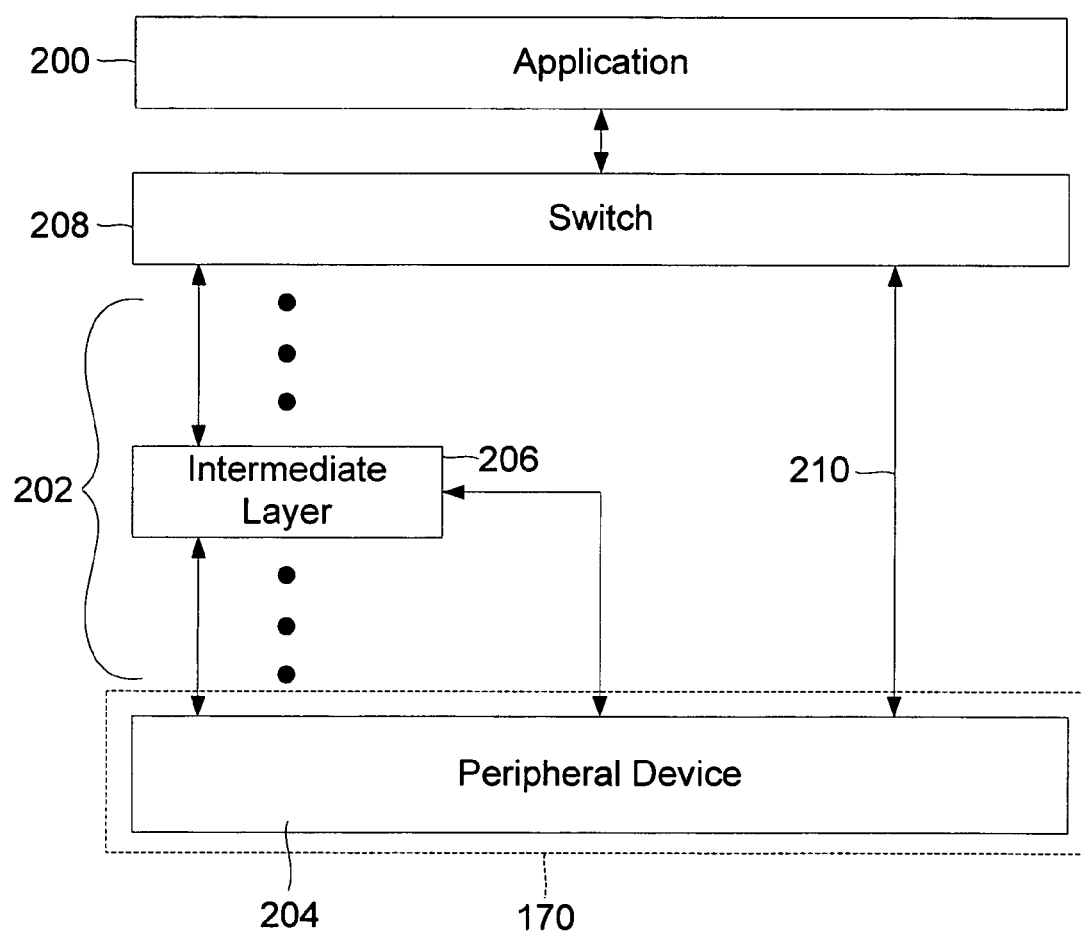
FIG. 2 is a block diagram illustrating the functional layers of the network stack and the bypass path of the present invention.

In the description that follows, a peripheral device having the functionality to perform network stack operations shall be used to describe the invention. As used below, the peripheral device 204 refers not only to a peripheral device, but also to any of the other embodiments of the processing module described above when the peripheral device is being described in terms of processing the offloaded network stack operations (i.e., the peripheral device processes the offloaded network stack operations in software, in hardware, or a mix of software and hardware). FIG. 2 illustrates the interrelationship of some of the components that make up a networking model and the components of the present invention. During normal operation, networked messages are sent by the application 200 through network stack 202 to the peripheral device 204 where the messages are sent to other devices and applications on the network and received from the other devices and applications. The network stack 202 includes one or more intermediate software layers 206. Data sent from application 200 travels through the intermediate software layer(s) 206 where specific operations may be performed on the data such as packaging the data, reliable data transmission, data encryption and calculation of a message digest.

The switch 208 is used to offload the processing unit 120 from performing network stack operations for the intermediate software layer(s) 206. While the switch 208 is shown separately, it should be noted that the switch 208 may be integrated into the top intermediate layer of the network stack 202. Data is sent to the peripheral device 204 via chimney 210 for the peripheral device 204 to perform network stack operations. In this hierarchy, the intermediate software layers do not have to exclusively reside in the host or the peripheral device and it allows any of the intermediate layers to either be completely offloaded, to remain in the host, or a combination of both (e.g., offload one or more specific connections). Additionally, chimneys may be layered on top of chimneys (e.g., an IPSEC chimney may be layered on top of a TCP chimney). A connection may be any combination of reliable and unreliable data transfer and unicast or multicast data transfer. If an intermediate layer remains in the host, the host updates cached variables (as described below) in the peripheral device 204. For example, a transport control block (TCB) state entry for a connection can be offloaded for the transport layer with a route cache entry (RCE) for the network layer offloaded to the peripheral device 204. The switch 208 continues to send traffic for a different TCB through the network stack 202 that shares the same RCE while the switch 208 sends traffic through the chimney 210 for the offloaded TCB.

The switch 208 initiates the offload by sending the intermediate layer 206 an offload request. The offload request includes resource information that helps the peripheral device 204 decide whether it can successfully offload the connection. Each intermediate layer 206 either refuses the offload request or adds resource information to the offload request and sends the offload request to the adjacent software layer in the network stack 202. When the peripheral device 204 receives the offload request, it calculates whether it has resources available to offload the connection. The peripheral device 204 refuses the offload request if the offload is not possible. Otherwise, the peripheral device 204 accepts the offload request and allocates resources for the connection. The peripheral device 204 completes the offload request by sending a completion message having a linked list of parameters to the intermediate software layer(s) 206. The linked list of parameters provides information to the intermediate software layer(s) 206 and switch 208 to allow the intermediate software layer(s) 206 and switch 208 to communicate with the peripheral device. Each intermediate software layer 206 removes information for its layer from the linked list of parameters.

When an intermediate layer 206 receives the completion message for offloading, the intermediate layer 206 passes its state to the peripheral device 204. Each state may have three types of variables: CONST, CACHED, and DELEGATED. A state may have all three types of variables or a subset of the three types of variables. CONST variables are constants that never change during the life of the offloaded connection. They are not read back to the layers when the connection is uploaded. The host processing unit 120 maintains ownership of CACHED variables and ensures that any changes to a CACHED variable in the host processing unit 120 are updated in the peripheral device 204. Control messages that change the CACHED state are handled by the network stack 202. As a result, the host will write but does not need to read back the CACHED variables when the connection is uploaded. The host processing unit 120 transfers ownership of DELEGATED variables to the peripheral device 204. The DELEGATED variables are written once when the offload occurs and are read back when the offload is terminated. By only transferring back the DELEGATED variables, the overhead of transferring the connection back to the host is minimized. State that must be shared (e.g. controlled) between the network stack 202 and the peripheral device 204 that for various performance reasons is being offloaded (i.e., delegated) is cleanly divided between the network stack 202 and chimney 210 (e.g., IP ID in TCP offloads) such that both the network stack 202 and peripheral device 204 each owns an exclusive portion of the state. The host processing unit 120 queries the peripheral device 204 for DELEGATED variables when needed (e.g., for statistics). The host processing unit 120 may also query CONST or CACHED variables for diagnostics. Dividing the state into three categories enables the network stack 202 to coexist cleanly with the chimney 210. It should be noted that the state may be included in the offload request. This can be done if either the state does not contain delegated state variables or contains delegated state variables that will not change between the initial offload request and the completion of the offload request.

The peripheral device 204 or the host decides when an offloaded connection is to be uploaded. The upload is initiated by either the peripheral device 204 or the switch 208. Once the upload is initiated, the peripheral device 204 completes all outstanding requests with appropriate state and hands the delegated state of the topmost intermediate layer to the switch 208. The switch 208 queues any further transmit requests and stops posting receive buffers. The switch 208 commands the topmost intermediate layer to take control of the delegated state. The topmost intermediate layer takes control of the delegated state and sends a completion message to the switch 208. After the switch 208 receives the completion message, the switch 208 confirms the upload to the peripheral device 204, which enables the peripheral device 204 to free resources that are no longer being used.

It should be noted that the topmost intermediate layer forwards incoming data packets for the offloaded connection to the peripheral device 204 for processing until it takes control of the delegated state. Data packets may arrive between the time the peripheral device 204 hands the delegated state to the switch 208 and the time that the topmost intermediate layer takes control of the delegated state. After the peripheral device 204 hands the delegated state to the switch 208, it can no longer process incoming data packets. The peripheral device 204 sends an error message to the topmost intermediate layer indicating an upload is in progress when it receives incoming data. The error message informs the topmost intermediate layer to stop forwarding incoming data and to buffer further data until the topmost intermediate layer receives the delegated state. Alternatively, at the expense of additional buffer memory on the peripheral device 204, the incoming data could be forwarded to the peripheral device 204 for the peripheral device 204 to buffer the data.

Multiple connections may be off-loaded by an intermediate software layer 206 to the peripheral device 204. A reference counter is maintained by the intermediate software layer 206 of the number of upper layer state objects (i.e., state objects of layers above the intermediate software layer 206) which reference the intermediate software layer's state object for offload. A state object as used herein is a collection of state variables for a particular layer that are categorized as CONST, CACHED, or DELEGATED as used herein. If an intermediate layer's offloaded state object has no references to it by a layer above it, the intermediate layer 206 sends a message to the peripheral device 204 to upload the state object for the intermediate layer and send delegated state variables to the intermediate layer 206. The peripheral device 204 deletes the state object for the intermediate layer 206 and the intermediate layer 206 sends a completion message to the switch 208.

Figure 3:
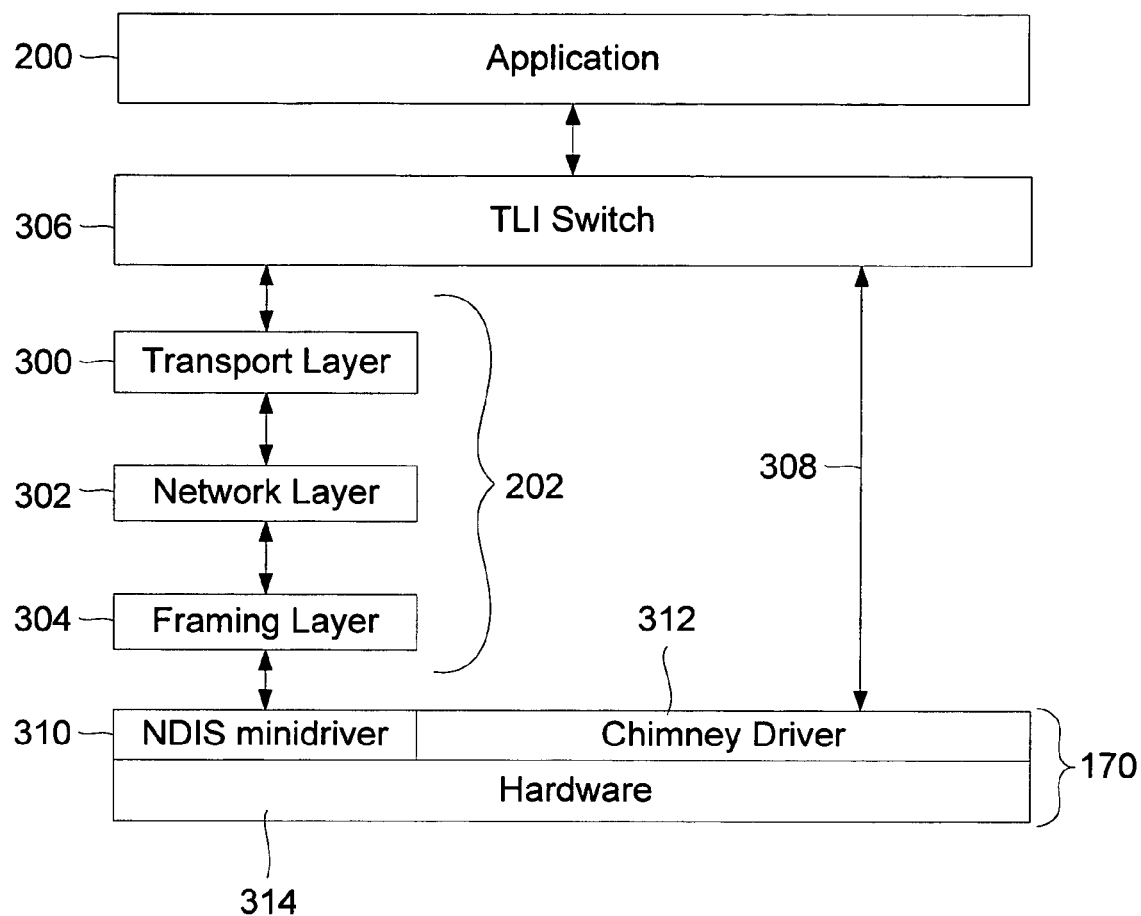
FIG. 3 is a block diagram illustrating the functional layers of the NDIS path and the bypass path of the present invention.

Turning now to FIG. 3, now that the overall concept has been described, the details of the invention will be described in an embodiment where the peripheral device 204 is NIC 170, the switch 208 is a transport layer interface switch (TLI) 306, and the network stack 202 comprises a transport layer 300, a network layer 302, and a framing layer 304. Network layer 302 is also known as a path layer and the framing layer 304 is also known as a neighbor layer.

Networked messages are sent by the application 200 through network stack 202 to the NIC 170 during operation. Data sent from the application 200 travels through the TLI switch 306, which controls whether the data goes down the host based network stack 202 or the chimney 308. Note that the TLI switch 306 may be incorporated into the top layer of the network stack 202. The software layers in the network stack 202 receive data from the application 200, package it in a packet form and send it to the peripheral device hardware 314 via NDIS minidriver 310. Other tasks the network stack 202 may perform as a data packet passes through the stack 202 includes data encryption, reliable data transmission, and calculation of a message digest (e.g., checksum or CRC for the data packet). Many of these tasks are performed by the processing unit 120 and are processor intensive.

The TLI switch 306 is used to offload the processing unit 120 from performing stack operations by sending data for connections to the NIC 170 via chimney 308 (and chimney driver 312). Those skilled in the art will recognize that the upper edge of NDIS minidriver 310 and chimney driver 312 is the NDIS API in Microsoft® operating systems. For purposes of explanation, a transmission control protocol (TCP) based protocol stack will be used to explain the invention. However, it will be appreciated that those skilled in the art will recognize that many types of peripheral devices may be used and other network stacks may be offloaded using the teachings of the present invention. For example, stream control transmission protocol (SCTP) or user datagram protocol (UDP) based protocol stacks may be offloaded. Additionally, the invention may also be used to offload higher function protocols such as the internet small computer system interface (iSCSI), the network file system (NFS), or the common interface file system (CIFS).

There are many reasons why an offload occurs. By way of example, and not limitation, some of the reasons are provided below. A system administrator could select a specific service to be offloaded. A specific connection may be offloaded if traffic (in terms of number of bytes or packets) on the connection is consuming a significant amount of resources. Types of services may be offloaded. For example, security protocols such as IPSEC may be offloaded. Offloads may be driven by policy. For example, an administrator may have a policy that all connections from within an organization are offloaded first. System resources (e.g., cpu utilization, data cache use, page table cache use, memory bandwidth) being used may lead the host processor to offload connections.

Figure 4:
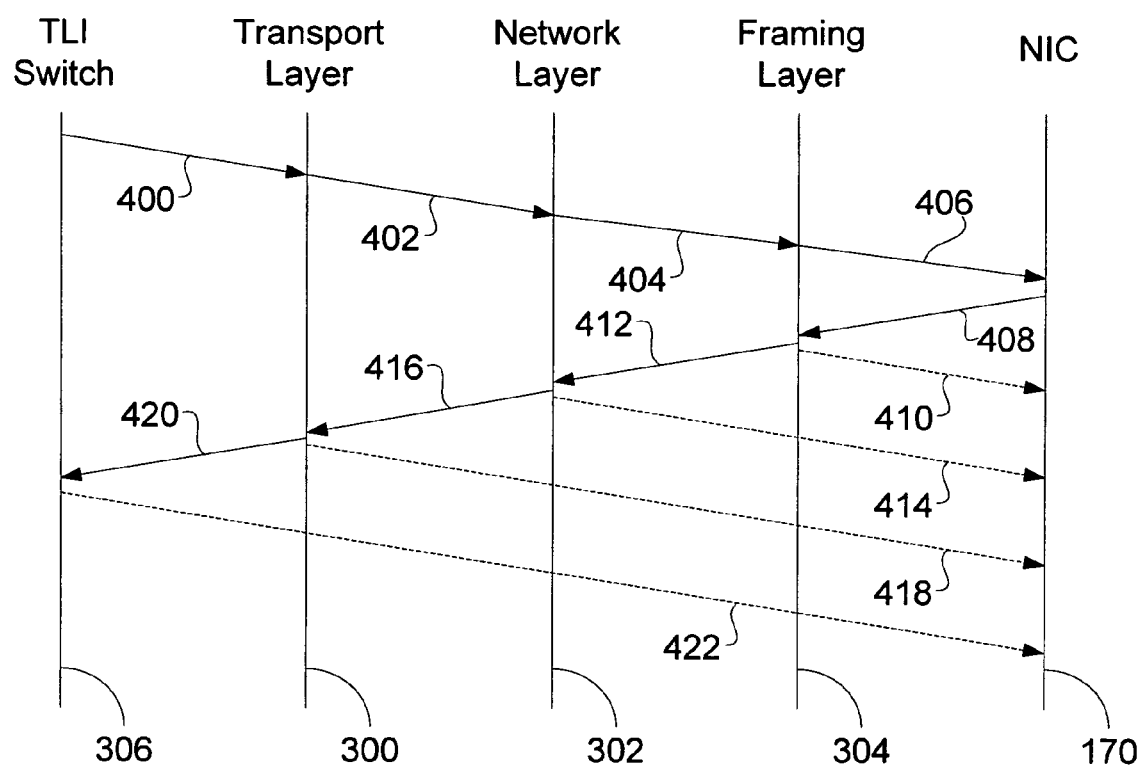
FIG. 4 is a ladder diagram illustrating the offload mechanism of the present invention.

FIG. 4 illustrates the steps taken to offload a TCP connection. A three stage process is used. In general, the three stage process is to allocate resources required to offload the TCP connection, provide handles to each of the layers 300, 302, 304, 306 and offloads the state for each of the layers 300, 302, 304, 306 to the NIC 170. During the offload transition, the TLI switch 306 buffers all messages sent from the application 200. Alternatively, the transport layer 300 buffers the data. When the offload is complete, the buffered data is transferred to the NIC 170 using the same mechanism as offload data transmission. When incoming packets are received during the offload transition, the NIC 170 continues to move the data up through the layers 300, 302, 304, 306 until the transport layer delegated state is handed to the NIC 170.

The TLI switch 306 initiates the offload by sending the transport layer 300 an offload request (line 400). The offload request includes a pointer to the next layer's local state (e.g., a TCB pointer for transport layer 300, an RCE pointer for network layer 302, an ARP table pointer for the framing layer 304 or a NDIS miniport pointer for the NDIS minidriver 310), the offload type (e.g., TCP for TLI switch 306, IPv6 for network layer 302, etc.), and resource information that helps the NIC 170 decide whether it can successfully offload the TCP connection. The TLI switch 306 may also provide dispatch tables to the NIC 170. The transport layer 300 either refuses the offload request or sends an offload request to network layer 302 with TCP resource information added to the TLI switch resource information (line 402).

The network layer 302 receives the offload request and either refuses to offload the connection or sends an offload request to the framing layer 304 with network resource requirements added to the TCP resource information and the TLI switch resource information (line 404). The network layer 302 may also provide dispatch tables to the NIC 170.

The framing layer 304 either refuses to offload the connection or sends an offload request to the NIC 170 with framing resource requirements added to the network resource requirements, the TCP resource information and the TLI switch resource information (line 306).

The NIC 170 receives the offload request and calculates whether it has resources available to offload the TCP connection. If the NIC decides the offload is not possible, it refuses the offload request. If the NIC decides the offload is possible, it accepts the offload request and allocates resources (e.g., TCB, route cache entry (RCE), address resolution protocol (ARP) table entry (ATE)) for the connection. The NIC 170 creates a linked list of parameters and dispatch tables to hand to the layers 300, 302, 304 and 306 and completes the offload request by sending a completion message having the linked list of parameters to the framing layer 304 (line 408). The parameters include an offload handle and dispatch table for each of the layers 300, 302, 304, 306. As used herein, an offload handle means a mechanism to allow a software layer to communicate with the peripheral device. By way of example and not limitation, the offload handle may be a pointer-based handle, an integer value used as a lookup into an array, a hash table (e.g., a hashing function), a communication channel between the software layer (or network stack) and the peripheral device, or a set of parameters passed down by a software layer that the peripheral device uses to look up the state object.

The dispatch tables are used to send data directly to the NIC 170 or receive data directly from the NIC 170. The dispatch tables can also be used to provide diagnostics. For example, a software layer could be added to monitor the system and inject faults to make sure the system is functioning properly. Additionally, the dispatch table can be patched by software layers that can add additional functionality if needed. For example, a software layer could be added to provide the functionality of a filter driver. Patching is typically done by grabbing the pointer to the original function where the added function is being inserted and redirecting it (i.e., pointing it) to the added function. After the patch has been inserted, the added function performs its function and then calls the original function whenever the original function is called.

The framing layer 304 stores the offload handle and dispatch table for the framing layer in its ARP Table Entry for easy updates if the destination MAC address changes or the encapsulation type changes. The framing layer 304 then updates the NIC 170 state associated with the ATE (line 410). The framing layer 304 removes its state from the linked list and forwards the remaining information in the linked list to the network layer 302 (line 412).

The network layer 302 stores the offload handle and dispatch table for the network layer 302. The network layer 302 also sends it state to the NIC 170 (line 414). The network layer 302 removes network layer information from the linked list and sends a completion message having the linked list of parameters and dispatch tables to the transport layer 300 (line 416). The network layer 302 may forward IP fragments it receives for the offloaded state to the NIC 170 for processing or it may process the IP fragments in the network layer and forward them to the transport layer 300.

In an alternate embodiment, the layer's state object is sent with the offload request. For example, the framing layer state object and network layer state object is sent with the offload request and only if the cached state changes between the offload request and the completion event is the state updated. The entire layer state object can only be sent with the offload request if the delegated state is either not present or cannot change between the offload request and the completion of the offload request. However, state variables classified as CONST may be sent with the offload request even if the delegated state is present and may change between the offload request and the completion of the offload request.

The transport layer 300 stores the offload handle for the transport layer and sends its state to the NIC 170 (line 418). If there are any outstanding send or receive buffers pending, the transport layer 300 returns the buffers to the TLI switch 306. Once the transport layer 300 starts handing the buffers back to the TLI switch 306, the TLI switch 306 will stop sending buffers to the transport layer 300 and queues them and waits for the transport layer 300 to send a completion message having the linked list of parameters and the dispatch table to the TLI switch 204. The transport layer 300 returns all buffers and then sends the completion message (line 420). Once the TLI switch 306 receives the completion message, the TLI switch 306 transfers the send and receive buffers to the NIC 170 (line 422). The TLI switch 306 uses the dispatch table to post all outstanding and future receive buffers and sends to the NIC 170 for processing. During the time the offload request takes to complete, each layer 300, 302, 304 either refuses new offload requests for the offloaded state object (i.e., the state object associated with a layer) or queues them until the offload is complete.

The transport layer 300 still has the ability to process incoming TCB data and hand the data to the TLI switch 306 if the transport state hasn't been offloaded to the NIC 170. If TCB data arrives in the middle of an offload, the transport layer 300 may either hold on to the data or process the data and hand it to the TLI switch 306. Between the time that the transport layer 300 sends its state to the NIC 170 (line 418) and the time the TLI switch transfers buffers to the NIC 170 (line 422), incoming TCB data coming up through the network stack 202 is sent to the NIC 170.

On subsequent offload requests, the network layer 302 and the framing layer 304 pass the offload handles they received from the NIC 170 from the prior offload to the NIC 170. This signals the NIC 170 that resources for the network layer 302 and framing layer 304 have already been allocated, which conserves NIC resources and speeds up the offload.

As previously indicated, the layers 300, 302, 304 pass their state to the NIC 170. Each state has three types of variables: CONST, CACHED, and DELEGATED. CONST variables are constants that never change during the life of the offloaded connection. They are not read back to the layers when the connection is terminated. The host processing unit 120 maintains ownership of CACHED variables and ensures that any changes to a CACHED variable in the host processing unit 120 are updated in the NIC 170. As a result, the host will write but never read back the CACHED variables (unless system diagnostics requests it). The host processing unit 120 transfers ownership of DELEGATED variables to the NIC 170. The DELEGATED variables are written once when the offload occurs and are read back when the offload is terminated. By only transferring back the DELEGATED variables, the overhead of transferring the connection back to the host is minimized. The host processing unit 120 queries the NIC 170 for DELEGATED variables when needed (e.g., for statistics)

The CONST variables for the transport layer 300 include the destination port, the source port, a flag to indicate there is a Mobile IP case where the 'care-of' address can change, SEND and RECV window scale factors, and the NIC handle for the network layer 302. The CACHED variables for the transport layer 300 are TCP variables and IP variables. The TCP variables include the Effective MSS, the number of bytes to be copied in the receive indicate by the NIC 170, a flag to turn off Nagling, a flag to indicate that Keep-Alive is needed, and Keep-Alive settings (i.e., interval, number of probes, and delta). The IP variables include TOS and TTL. The DELEGATED variables include current TCP state, sequence number for next RECV (i.e., RCV.NEXT), receive window size (RCV.WND), the sequence number for First Un-Acked Data (SND.UNA), the sequence number for next SEND (SND.NEXT), the maximum sequence number ever sent (SND.MAX), the maximum Send Window (MAX_WIN), the current congestion window (CWIN), the slow start threshold (SSTHRESH), the smoothed RTT (8*A), Delta (8*D), the current retransmit count, the time remaining for Next Retransmit, and the time stamp to be echoed.

The CONST variables for the network layer 302 include the destination IP address (for either IPv4 or IPv6) and the source destination IP address (for either IPv4 or IPv6). The CACHED variables for the network layer 302 include the NIC handle for the framing layer 304. The DELEGATED variables for the network layer 302 include the IP Packet ID start value. The CACHED variables for the framing layer 304 include the ARP address and a flag to indicate the format of the header (e.g., LLC/SNAP [Logical Link Control/Sub-Network Access Protocol] or DIX [Digital, Intel, Xerox]).

The transport layer state includes a handle for the network layer and the network layer state includes a handle for the framing state because the network layer state can be shared between multiple connections and the framing layer state can be shared between multiple paths (e.g., IP aliases). This hierarchy is maintained for several reasons. A connection requires a NIC handle for the network layer because the IP ID namespace must be managed across all offloaded connections on a per path basis. A path requires a NIC handle for the framing layer because a route update could change the next hop address, thus pointing to a new MAC address. The hierarchy also condenses the amount of state required to be maintained by the NIC. For example, an ARP update for IPv4 could change the mapping from an IP address to a MAC address (e.g., an interface failed over on the server). The host maintains the MAC address as a cached variable, thus it only needs to do a single update of the cached state and all connections are failed over to the new interface.

Once a TCP connection is offloaded, the NIC 170 is responsible for assigning packet identifiers (e.g., IP IDs) for the packets it sends. IP ID is offloaded on either a per interface basis or a per layer state object basis. The NIC 170 is assigned a portion of the IP ID namespace. In one embodiment, the NIC 170 is assigned half of the total IP ID namespace and is given an IP packet ID start value to use when the network state is passed to the NIC 170. The NIC 170 uses the following formula to generate an IP ID on IP packets it sends:

Cur_IPID=[(Start_IPID_For_This_Path)+(Counter_For_This_Path)mod 32K] mod 64K

Counter_For_This_Path=Counter_For_This_Path+1

When the offloaded connection is either uploaded or invalidated, the NIC 170 transfers the next IPID value it would use to the network layer to store for the next offload that occurs and the host processing unit 120 continues to use the portion of the IP ID namespace it was assigned. The host processing unit 120 could use the full IP ID name space, but the counter would have to be set each time an offload occurs.

The NIC 170 places data into receive buffers in the order the data is received and fills application buffers in the order they are posted for the offloaded connection. Many applications wait for a receive indication before posting a receive buffer. In one embodiment, the NIC 170 has a global pool of buffers to use if data arrives for a connection and no application receive buffers have been posted. The global pool of buffers is used across the offloaded connections and may be used to implement: 1) handling of out-of-order TCP transmissions; 2) de-fragmenting IP datagrams; 3) a buffer copy algorithm rather than a zero copy algorithm if the application is posting buffers that are too small for a zero copy algorithm. Alternatively, a per-connection pool of buffers may be used if efficient use of resources is not a concern. However, the global pool of buffers is used if a NIC does not support a per connection pool of buffers or for lack of system resources (e.g., not enough resources to pin the application buffer in memory).

Figure 5A:
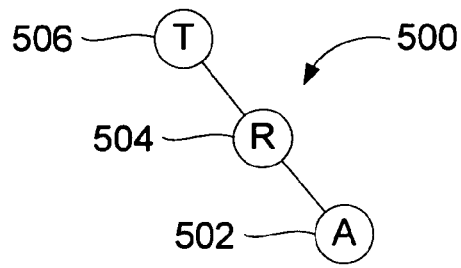
FIGS. 5a-5d are diagrams illustrating an inverted tree of the present invention.
Figure 5B:
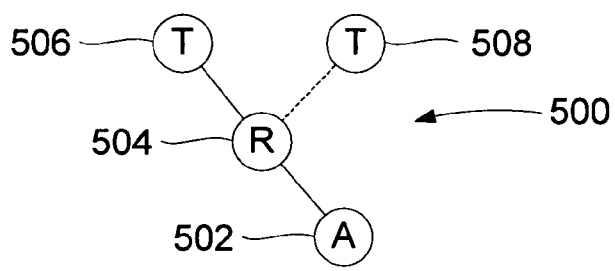

Turning now to FIGS. 5a-5d, the NIC 170 has an inverted tree 500 that is representative of the offload once an offload has occurred. In the figures, dotted lines represent new states allocated by the NIC 170. In FIG. 5a, the NIC 170 has an ARP entry 502 coupled to a route cache entry 504 that is coupled to a TCP entry 506. If, for example, all traffic is going to a router, the next hop will always be to the same ARP entry 502. If the route cache entry 504 is to be used for the next TCP connection offload, the only new resource is the new offloaded TCB. Thus when an offload is initiated down the network stack 202, the intermediate software layers that have already offloaded their state (e.g. network layer 302 and framing layer 304) would simply insert the NIC generated offload handle that was allocated on the previous offload request. The NIC 170 only has to allocate new resources (e.g. TCP entry 508) and send offload handles for the new resources back up the network stack 202. The inverted tree 500 now has TCP entry 508 coupled to the route cache entry 504 (see FIG. 5b). This approach saves NIC resources and speeds up the offload. Additionally, if a cached variable state changes, only a single structure needs to be updated. If all state for the various software layers in the chimney were offloaded as a single entry, any state update below the top software layer would require multiple updates.

Figure 5C:
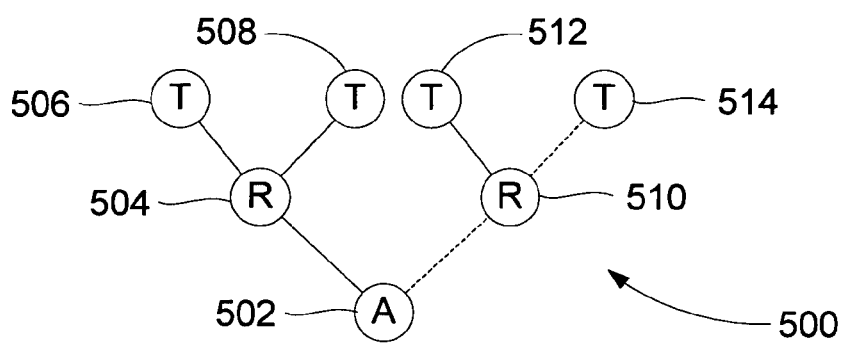
Figure 5D:
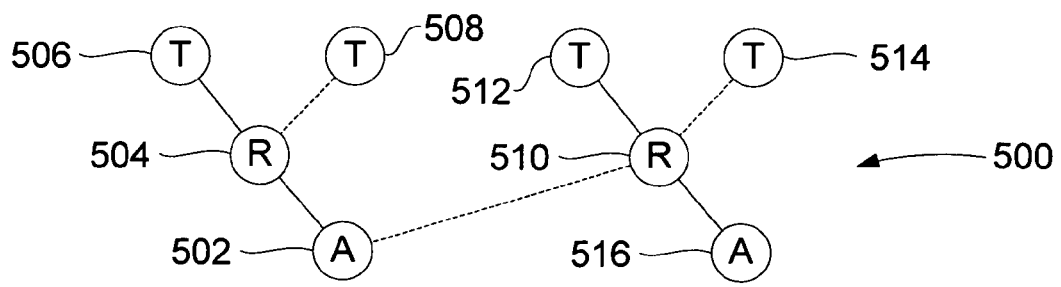

FIG. 5C shows the inverted tree 500 with a more complex configuration. There are two route cache entries, 504 and 510, that go through ARP table entry 502. TCP connections 506 and 508 utilize route cache entry 504. TCP connections 512 and 514 reference route cache entry 510. If any ARP update occurs (e.g., a multi-homed server's interface fails over), only entry 502 must be updated. This enables potentially thousands or hundreds of thousands of connections to be failed-over to a new interface with only a single update to the NIC 170 required. FIG. 5d shows two independent inverted trees (entries 502-508 and entries 510-516) merged into a single inverted tree 500 after a route update occurs. Before the route update, the next hop ARP entry for route cache entry 510 is ARP table entry 516. After the route update, the next hop ARP table entry is ARP table entry 502. Thus, the use of an inverted tree enables route updates to be processed as a single transaction to the NIC 170, rather than thousands or tens of thousands of updates if the network stack state were offloaded as a single entry.

Figure 6:
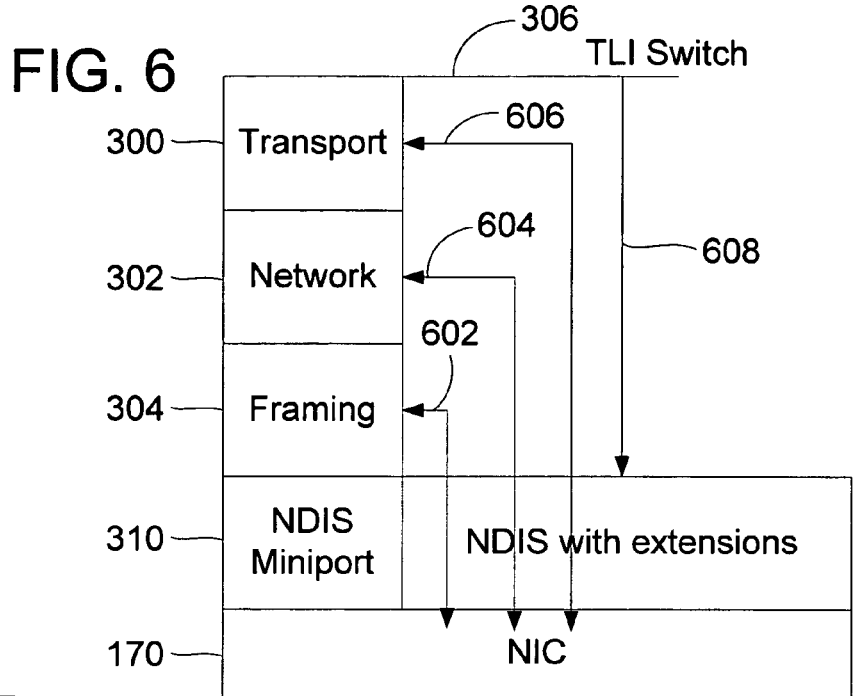
FIG. 6 is a block diagram illustrating the synchronization between the host computer and the peripheral device.

Turning now to FIG. 6, once a connection has been offloaded to the NIC 170, there are two paths to the NIC 170. The first path is through the NDIS minidriver 310 through the framing layer 304, the network layer 302, and the transport layer 300. The second path is through the offloaded connection 608, which is called a chimney. From the host computer's perspective, everything is the same for the two paths in terms of communication. The cached state variables synchronize the two paths with the processing unit 120 updating the cached state variables in the NIC 170 as previously indicated. The updating of cached variables is indicated by arrows 602, 604, 606.

When an incoming data packet arrives, the NIC 170 determines whether the incoming data packet goes through the offloaded path or the non-offloaded path (i.e., through the NDIS path of NDIS minidriver 310 and the layers 304, 302, 300). In one embodiment, the NIC 170 determines which path to send the incoming data packet by performing a hashing function on the source and destination TCP port number, source and destination IP address and protocol type. If the hash matches the offloaded connection parameters (i.e., a hash bucket chain is walked and exact matching of all the tuples of the connection occurs), the chimney 608 is used. If the hash does not match the hash index, the non-offloaded path through network stack 202 is used. Control messages which update cached states are handled by the host. This results in the NIC 170 not having to handle any control messages outside of the offloaded connection such as ICMP, DNS, and RIP messages.

The present invention provides a user with the capability to derive statistics using existing tools such as Netstat to retrieve a variety of information including all connections on the host, connection parameters such as protocol type, local and remote port and IP address bindings, state of the connection, process id, etc. Statistics are gathered on either a per layer basis or a per layer state object basis in the present invention. Within a layer, the layer state objects may be grouped to gather statistics across multiple layer state objects. For example, statistics for the network layer may be split such that the statistics are for each protocol being used (e.g., IPv4 and IPv6). Statistics associated with CONST and CACHED state variables are provided by the host and statistics associated with DELEGATED state variables are provided by the peripheral device 204. When a query is made, the statistics associated with DELEGATED state variables are appended to the statistics associated with CONST and CACHED state variables.

There is also a class of statistics that is summed across the entire grouping of host layer state and peripheral device layer state such as packet count. Another type of statistic is a listing of the state of a function in the system (e.g., a listing of the state of every TCB in the system). The statistics for a TCB are the combination of statistics tracked by the host and the statistics tracked by the peripheral device. Similarly, the statistic for packet count is the sum of the host layer state statistic and the peripheral device layer state statistic.

An example of the split between the host and peripheral device 204 for TCP MIB (Management Information Base) is illustrated in Table 1 below and IPv4 MIB statistics is presented in Table 2 below. In the tables, the first column is the field, the second column designates if the peripheral device or the host network stack is responsible for tracking the statistic and the third field indicates how the field is tracked. Statistics that the peripheral device is responsible for are tracked on a per layer state object basis or a per layer basis. Per layer as used herein means the statistic is tracked per layer per peripheral device per protocol. Note, however, that when the statistic is synthesized from the host state and the state from the peripheral device(s), it is generally presented on a per protocol basis. Statistics that the host network stack can generate without querying the peripheral device are categorized as "stack has complete info" or "done by stack only." The "stack has complete info" category indicates that the peripheral device knows about the statistic, but does not track the statistic. The "done by stack only" statistic indicates that the peripheral device does not know about the statistic. Adapter statistics are queried through the regular NDIS interface. The adapter statistics includes variables such as bytes sent, bytes received, etc.

TABLE 1

TCP MIB Statistics Split

| TCPStats Structure field | Responsibility | How field is tracked |
| --- | --- | --- |
| ts_RtoAlgorithm | host network stack | Stack has complete info |
| ts_toMin | host network stack | Stack has complete info |
| ts_RtoMax | host network stack | Stack has complete info |
| ts_MaxConn | host network stack | Stack has complete info |
| ts_ActiveOpens | host network stack | Done by stack only |
| ts_PassiveOpens | host network stack | Done by stack only |
| ts_AttemptFails | host network stack | Done by stack only |
| ts_EstabResets | host network stack | Stack has complete info |
| ts_CurrEstab | host network stack and peripheral device | Per layer |
| ts_InSegs | host network stack and peripheral device | Per layer |
| ts_OutSegs | host network stack and peripheral device | Per layer |
| ts_RetransSegs | host network stack and peripheral device | Per layer |
| ts_InErrs | host network stack and peripheral device | Per layer |
| ts_OutRsts | host network stack and peripheral device | Per layer |
| ts_NumCons | host network stack | Stack has complete info |

The ts_RtoAlgoithm is a value for an algorithm used to determine the timeout value used for retransmitting unacknowledged octets. The ts_Rto_Min is a value for the minimum value permitted by a TCP implementation for the retransmission timeout measured in milliseconds. The ts_Rto_Min is the maximum value permitted by a TCP implementation for the retransmission timeout measured in milliseconds. The ts_MaxConn is the total number of TCP connections that can be supported. The ts_ActiveOpens is the number of times TCP connections have made a direct transition to the SYN_SENT state from the CLOSED state. The ts_PassiveOpens is the number of times TCP connections have made a direct transition to the SYN_RCVD state from the LISTEN state. The ts_AttemptFails is the number of times TCP connections have made a direct transition to the CLOSED state from either the SYN-SENT state or the SYN-RCVD state plus the number of times TCP connections have made a direct transition to the LISTEN state from the SYN-RCVD state. The ts_EstabResets is the number of times TCP connections have made a direct transition to the CLOSED state from either the ESTABLISHED state or the CLOSE-WAIT state. The ts_CurrEstab is the number of TCP connections for which the current state is either ESTABLISHED or CLOSE-WAIT. The ts_InSegs is the total number of segments received, including those received in error. The ts_OutSegs is the total number of segments sent, including those on current connections but excluding those containing only retransmitted octets. The ts_RetransSegs is the total number of segments retransmitted. The ts_InErrs is the total number of segments received in error (e.g., bad TCP checksums). The ts_OutRsts is the number of TCP segments sent containing the RST flag. The ts_NumCons is the total number of TCP connections that currently exist.

TABLE 2

IPv4 MIB Statistics Split

| IPSNMPInfo Structure field | Responsibility | How field is tracked |
| --- | --- | --- |
| ipsi_Forwarding | host network stack | Done by stack only |
| ipsi_DefaultTTL | host network stack | Stack has complete info |

TABLE 2-continued

IPv4 MIB Statistics Split

| IPSNMPInfo Structure field | Responsibility | How field is tracked |
| --- | --- | --- |
| ipsi_InReceives | host network stack and peripheral device | Per layer |
| ipsi_InHdrErrors | host network stack and peripheral device | Per layer |
| ipsi_InAddrErrors | host network stack | Done by stack only |
| ipsi_Forwdatagrams | host network stack | Done by stack only |
| ipsi_UnknownProtos | host network stack | Done by stack only |
| ipsi_InDiscards | host network stack and peripheral device | Per layer |
| ipsi_InDelivers | host network stack and peripheral device | Per layer |
| ipsi_OutRequests | host network stack and peripheral device | Per layer |
| ipsi_RoutingDiscards | host network stack | Done by stack only |
| ipsi_OutDiscards | host network stack and peripheral device | Per layer |
| ipsi_OutNooutes | host network stack and peripheral device | Per layer |
| ipsi_ReasmTimeout | host network stack | Stack has complete info |
| ipsi_ReasmReqds | host network stack and peripheral device | Per layer |
| ipsi_ReasmOKs | host network stack and peripheral device | Per layer |
| ipsi_ReasmFails | host network stack and peripheral device | Per layer |
| ipsi_FragOKs | host network stack | Done by stack only |
| ipsi_FragFails | host network stack | Done by stack only |
| ipsi_FragCreates | host network stack | Done by stack only |
| ipsi_NumIf | host network stack | Done by stack only |
| ipsi_NumAddr | host network stack | Done by stack only |
| ipsi_NumRoutes | host network stack | Done by stack only |

The ipsi_Forwarding is a value that provides an indication of whether the host is acting as an IP router in respect to the forwarding of datagrams received by, but not addressed to, the host. The ipsi_DefaultTTL is the default value inserted into the Time-To-Live field of the IP header of datagrams originated at this entity, whenever a TTL value is not supplied by the transport layer protocol. The ipsi_InReceives is the total number of input datagrams received from interfaces, including those received in error. The ipsi_InHdrErrors is the number of input datagrams discarded due to errors in their IP headers, including bad checksums, version number mismatch, other format errors, time-to-live exceeded, errors discovered in processing their IP options, etc. The ipsi_InAddrErrors is the number of input datagrams discarded because the IP address in their IP header's destination field was not a valid address to be received at the host. The ipsi_ForwDatagrams is the number of input datagrams for which the host was not their final IP destination, as a result of which an attempt was made to find a route to forward them to that final destination. The ipsi_UnknownProtos is the number of locally-addressed datagrams received successfully but discarded because of an unknown or unsupported protocol. The ipsi_InDiscards is the number of input IP datagrams for which no problems were encountered to prevent their continued processing, but which were discarded (e.g., for lack of buffer space). The ipsi_InDelivers is the total number of input datagrams successfully delivered to IP user-protocols. The ipsi_OutRequests is the total number of IP datagrams which local IP user-protocols (including ICMP) supplied to IP in requests for transmission. The ipsi_RoutingDiscards is the number of routing entries which were chosen to be discarded even though they are valid. The ipsi_OutDiscards is the number of output IP datagrams for which no problem was encountered to prevent their transmission to their destination, but which were discarded (e.g., for lack of buffer space). The ipsi_OutNoRoutes is the number of IP datagrams discarded because no route could be found to transmit them to their destination. The ipsi_ReasmTimeout is the maximum number of seconds which received fragments are held while they are awaiting reassembly at the host. The ipsi_ReasmReqds is the number of IP fragments received which needed to be reassembled at the host. The ipsi_ReasmOKs is the number of IP datagrams successfully re-assembled. The ipsi_ReasmFails is the number of failures detected by the IP re-assembly algorithm (e.g., timed out, errors, etc). The ipsi_FragOKs is the number of IP datagrams that have been successfully fragmented at the host. The ipsi_FragFails is the number of IP datagrams that have been discarded because they needed to be fragmented at the host but could not be, e.g., because their Don't Fragment flag was set. The ipsi_FragCreates is the number of IP datagram fragments that have been generated as a result of fragmentation at the host. The ipsi_NumIf is the total number of useable interfaces. The ipsi_NumAddr is the total number of unique IP addresses on the system. The ipsi_NumRoutes is the total number of currently active routes.

The present invention also provides a method to upload an offloaded network connection from the peripheral device to the host. There are many reasons why an upload occurs. By way of example, and not limitation, some of the reasons are provided below. The route may have changed, requiring traffic to be sent on a different interface. Connection traffic behavior may change such that it is no longer be suitable for offload. For example, there may be insufficient traffic, lack of activity, or the connection is being flow controlled for longer than a set time (e.g., no window updates are being received). Additionally, the peripheral device may not be able to support a particular function, the traffic behavior may be unsuitable for offload if there are too many IP fragments, too much out-of-order traffic, use of out-of-band data, too many retransmissions, a keep-alive has timed out, a security association becomes invalid and is not renewed, or too much data is being forwarded to the peripheral device. Other reasons for uploading an offloaded connection are due to resource issues. For example, the peripheral device may lack resources to continue processing the connection(s). Another connection may have higher priority than the offloaded connection and uploading a connection when peripheral device resource availability is below a threshold may enable the higher priority connection to continue to use peripheral device resources.

System resources may have changed such that the host processor has resources to handle an offloaded connection. The chimney may require different resources than the original offload (e.g., security filter change, etc.). The host can determine if the peripheral device's resources are approaching threshold levels where an offload connection would be more efficiently handled by the host processing unit. For example, the thresholds may include traffic size (number of bytes or packets), number of fragments, window size, and type of offload.

Figure 7:
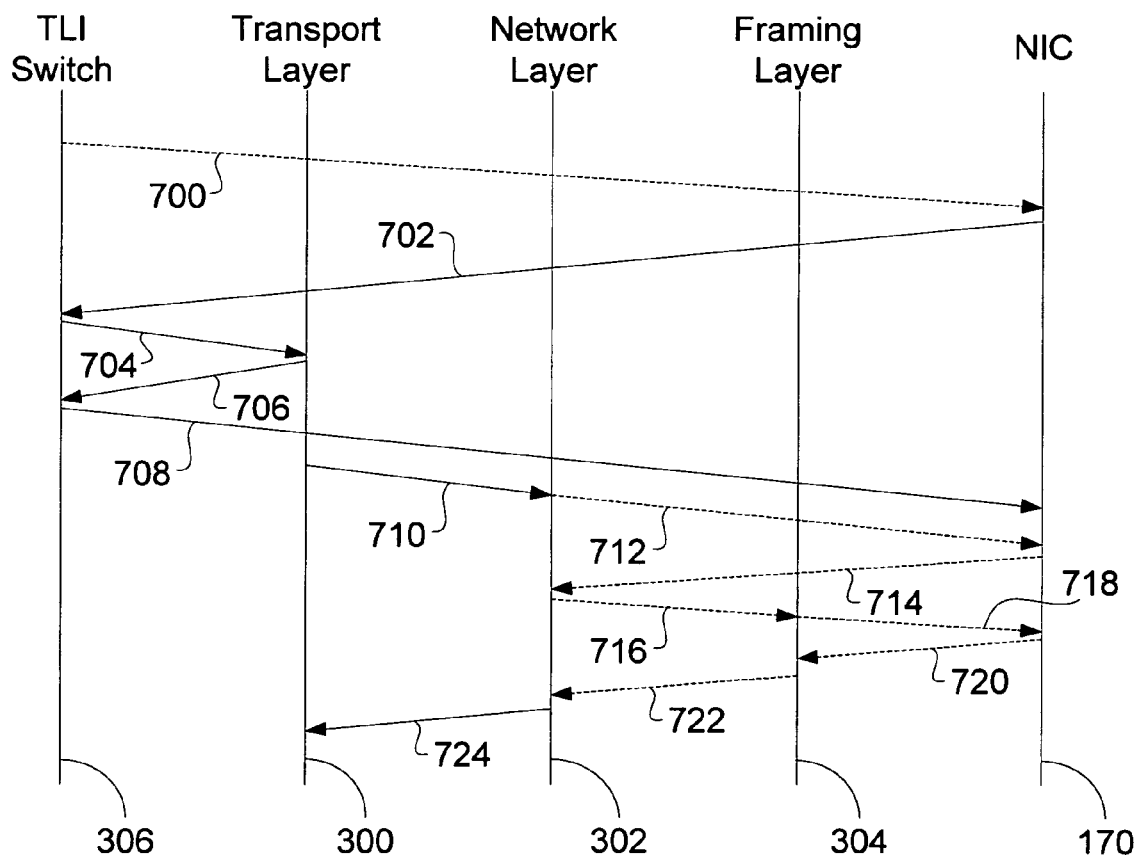
FIG. 7 is a ladder diagram illustrating the upload mechanism of the present invention.

Turning now to FIG. 7, the upload is initiated by either the peripheral device 204 (e.g., the NIC 170) or the TLI switch 306. The connection may be uploaded for a variety of reasons. The reasons include the connection moving to another peripheral device, a media disconnect occurring, too many out of order segments, too much data is being forwarded to the peripheral device 204, the application 200 is not pre-posting buffers, too many IP fragments, a low bandwidth connection, and too many retransmissions.

FIG. 7 shows the upload being initiated by the TLI switch 306 (line 700). Note that if the NIC 170 initiates the upload, line 700 would not be present. Once the upload is initiated, the NIC 170 completes all outstanding requests with appropriate state and hands the delegated transport layer state to the switch layer (line 702). The NIC 170 might not complete a transmission or completely fill a receive buffer. The NIC 170 just ensures that all transmit and receive state is synchronized with the delegated state handed back to the transport layer 300. The TLI switch 306 queues any further transmit requests and stops posting receive buffers. The TLI switch 306 commands the transport layer to take control of the delegated transport state (line 704). The transport layer 300 stops forwarding any segments it receives to the NIC 170 and takes control of the delegated state and sends a completion message to the TLI switch 306 (line 706) After the TLI switch 306 receives confirmation that the transport layer 300 has taken control of the delegated transport state, the TLI switch 306 confirms the upload to the NIC 170 (line 708), which enables the NIC 170 to free resources. The transport layer 300 also informs the network layer 302 of the uploading connection before or after the completion message is sent to the TLI switch 306 (line 710).

It should be noted that the transport layer 300 forwards incoming data packets for the offloaded connection to the NIC 170 for processing until it takes control of the delegated state (line 706). Data packets may arrive between the time the NIC 170 hands the delegated state to the TLI switch 306 (line 702) and the time that the transport layer 300 takes control of the delegated state (line 706). Once the NIC 170 hands the delegated state to the TLI switch 306, it can no longer process incoming data packets. When the NIC 170 receives an incoming packet for the uploading connection, it sends an error message to the transport layer 300 indicating an upload is in progress and may discard the incoming packet. The error message informs the transport layer 300 to stop forwarding incoming data. In one embodiment, the transport layer 300 buffers further data until it receives the delegated state.

Multiple connections may be offloaded by intermediate software layers to the peripheral device. A reference counter is maintained by the intermediate software layer of the number of connections offloaded from the intermediate software layer to the peripheral device. If the reference count goes to zero, an upload request is generated to the next intermediate software layer. This will cause the next layer's reference count to be decremented. The upload request continues down the network stack 202 if the next layer's reference count goes to zero. This process repeats until either an intermediate software layer's reference count is not zeroed or the peripheral device receives the upload request. The network layer 302 decrements a reference count of the number of offloaded state objects associated with the NIC 170. If the reference count goes to zero, then no TCBs are using the resources allocated in the NIC 170 for the network layer 302. When the reference count goes to zero, the network layer 302 sends a message to the NIC 170 to upload the state object for the network layer 302 and send delegated network state variables to the network layer 302 (line 712). The NIC 170 deletes the state and sends delegated network state variables and the next IPID value the NIC 170 would have used to the network layer 302 (line 714). The network layer 302 stores this information to use as the initial value if a connection is offloaded again. The network layer 302 also sends a message to the framing layer 304 to cause the framing layer 304 to decrement its reference count (line 716).

The framing layer 304 also maintains a reference count and decrements its reference count when the message from the network layer 302 is received. If the reference count in the framing layer 304 goes to zero, the framing layer sends a message to the NIC 170 to delete the framing layer state (line 718). The NIC 170 deletes the state variables in the NIC 170 and sends any delegated state variables it has to the framing layer (line 720). The framing layer 304 sends a completion message to the network layer 302 (line 722) and the network layer 302 sends a completion message to the transport layer (line 724).

A TCP connection may be required to use a secure connection using security protocols such as IPSEC at any point in its lifetime. If a connection is IP secure and the peripheral device 204 can not handle security, the connection cannot be offloaded. When a secure IP connection is offloaded, the security association(s) state is divided into CONST, CACHED, and DELEGATED variables and are handled as previously described. The host processing unit 120 manages control messages such as renegotiation of keys. The peripheral device 204 performs all necessary IPSEC data operations using the security association state variables.

Turning now to FIG. 8, the steps of offloading a secure connection are illustrated. In the description that follows, the steps previously described that are shown in FIG. 4 remain the same and shall not be repeated. An IPSEC connection operating in the transport mode shall be used for purposes of illustration. An IPSEC layer offload begins when the transport layer 300 sends an offload request to IPSEC layer 800 with TCP resource information added to the TLI switch resource information (line 402'). The IPSEC layer 800 sends an offload request to the network layer 302 with IPSEC resource requirements added to the TCP resource information and the TLI switch resource information (line 802). The resource requirements include the number of security associations the IPSEC layer wants to offload. If the NIC accepts the offload request, it allocates resources to handle the security associations. The network layer 302 sends a completion message having the linked list of parameters and the dispatch table to the IPSEC layer instead of the transport layer 300 (line 804).

When the IPSEC layer 800 receives the completion message, it sends the IPSEC layer states to the NIC 170 as part of inbound descriptors and outbound descriptors if the state has not been previously offloaded and transfers ownership of the delegated state in the security association to the NIC 170 (line 806). If the state has been previously offloaded, the IPSEC layer increments a reference count. Once the ownership has been transferred, the NIC 170 decrypts and encrypts all packets. The IPSEC layer 700 sends a completion message having the linked list of parameters and the dispatch table to the transport layer (line 414').

The CONST state variables passed to the NIC 170 from the IPSEC layer 800 consist of information required to classify packets to a particular security association and information specific to inbound and outbound security associations. The CONST variables include source and destination port, protocol type, and security association variables.

The CACHED state variables comprise factors for deciding the life time of the security association and information specific to inbound and outbound security associations. The CACHED variables include a soft limit (e.g., a rekey on byte count) and a hard limit (e.g., a stop on byte count) based on the bytes encrypted, a soft limit (e.g., rekey at a predefined tick) and a hard limit (e.g., stop at a predefined tick) on the maximum time the security association can be used, and a hard limit (e.g., maximum idle ticks) on the maximum idle time for which a security association may be used. The NIC 170 abides by the soft and hard limits. When a soft limit is reached, the NIC 170 informs the host processing unit 120. When a hard limit is reached, the NIC 170 discards the security association.

The DELEGATED variables comprise running information and information specific to inbound and outbound security associations. The DELEGATED variables include a count of the bytes encrypted or decrypted with the security association, the life time of the security association, and the idle time of the security association.

Turning now to FIG. 9, uploading an offloaded network connection with IPSEC from the peripheral device to the host is illustrated. In the description that follows, the steps previously described that are shown in FIG. 7 remain the same and shall not be repeated. The transport layer 300 informs the IPSEC layer 800 of the uploading connection before or after the completion message is sent to the switch layer 306 (line 710'). The reference count associated with all security associations is decremented. If no reference count goes to zero, the IPSEC layer 800 sends a completion message to the transport layer 300 (line 724'). If the connection being offloaded is the last connection using a specific security association, the IPSEC layer 800 sends a message to the NIC 170 to upload the delegated state variables to the IPSEC layer 800 (line 900). The NIC 170 returns the delegated state variables to the IPSEC layer 800 (line 902). The NIC 170 stops using the security association and sends packets that belong to the security association to the IPSEC layer 800 through the stack 202. The IPSEC layer 800 sends a completion message to the NIC 170 and the NIC 170 frees the resources allocated for the security association (line 904).

If the security association reference count goes to zero, the IPSEC layer 800 also sends a message to the network layer 302 informing the network layer 302 of the uploaded state (line 906). After the framing layer 304 sends a completion message to the network layer 302 (line 722), the network layer 302 sends a completion message to the IPSEC layer (line 908) The IPSEC layer 800 sends a completion message to the transport layer (line 724').

When the states for the transport layer 300, network layer 302, framing layer 304, or IPSEC layer 800 are being offloaded, it is possible that an update (e.g., ARP update or RIP update) could arrive. If the update occurs before the completion message is received, the local state is simply updated and a flag is set to indicate that the state has changed if the state object was sent with the offload request.

A possible race exists if the update occurs while the NIC's update routine to update the cached states is being called. If a separate message then updates the state, causing the NIC update routine to be called, it is possible that the NIC will see the second call first due to scheduling issues, and end up using stale data when the original update arrives. If stale data is used, the wrong entry would be used until the next update arrives, which could result in a large magnitude of data either being sent to the wrong place or getting dropped. There are two possible solutions to this race condition. The first possible solution is to have the completion message always perform the second update, which can result in recursion problems if a large number of updates are coming in. The second possible solution is to add a sequence number to the update to ensure the most recent sequence number is always used.

Another operating mode that IPSEC supports is tunneling, where data packets are encapsulated in a new packet as part of a secure connection. A tunnel appears as a virtual interface to the network stack 202. The steps to offload an IPSEC tunnel are similar to the steps to offload an IPSEC connection in the transport mode. In the transport mode, an IPSEC header is placed between the IP header and the TCP header. In the tunnel mode, UDP is used to provide a tunnel. The header chain is TCP header to IPSEC header to UDP header to IP header to framing layer header. In order to establish a tunnel, an inbound descriptor and an outbound descriptor that describe the negotiated security connections are sent to the peripheral device. The descriptors contain the state variables for the connection and other information required to establish the connection. The CACHED and DELEGATED state variables for a tunnel are the same as the transport mode CACHED and DELEGATED state variables. The CONST state variables for a tunnel include source and destination port, local address, remote address, protocol type, and security association variables.

A method to offload and upload network stack connections to a peripheral device has been described that maintains a tight synchronization with the host processing unit. The method can be used with many protocols. For example, protocols that can be used include TCP, SCTP, etc.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable storage medium having computer-executable instructions to offload a network stack state object and at least one associated protocol stack in a computer system environment from a first path going through a plurality of software layers having tasks performed by a first processor to a peripheral device to a second path going from a switch layer to the peripheral device having tasks performed by a second processor, the network stack state object having a cached state variable and at least one of a constant state variable and a delegated state variable, the computer-executable instructions performing the steps comprising:

sending a request to offload the network stack state object from the switch layer to the peripheral device through the plurality of software layers and the second processor, the request having a list of resource requirements;

if the network stack state object will be offloaded:

receiving an offload handle at least one of the plurality of software layers;

sending the network stack state object to the second processor from the at least one of the plurality of software layers; and transferring buffers to the second processor from the switch layer.

2. The computer-readable storage medium of claim 1 wherein at least one of the plurality of software layers adds layer resource requirements to the list of resource requirements.

3. The computer-readable storage medium of claim 1 having further computer-executable instructions for the step comprising receiving at least one first dispatch table from the second processor.

4. The computer-readable medium of claim 3 wherein the at least one first dispatch table comprises at least one of a protocol stack dispatch table for the entire network stack and a layer dispatch table for one of the plurality of software layers.

5. The computer-readable storage medium of claim 3 having further computer-executable instructions for the step comprising sending a second dispatch table to the second processor.

6. The computer-readable storage medium of claim 5 having further computer-executable instructions for the step comprising patching the first dispatch table and the second dispatch table to add at least one software layer to perform at least one function.

7. The computer-readable storage medium of claim 6 wherein the at least one software layer performs at least one of an added function, a performance diagnostic, and a functionality diagnostic.

8. The computer-readable storage medium of claim 1 further comprising the steps of
determining, by each of the plurality of software layers, if a previous offload occurred; and
if the previous offload occurred:
sending the offload handle to the second processor.

9. The computer-readable storage medium of claim 1 wherein one of the plurality of software layers is a TCP layer and wherein the constant variable includes at least one of a destination port, a source port, a window scale factor, and the offload handle.

10. The computer-readable storage medium of claim 1 wherein one of the plurality of software layers is a TCP layer and wherein the cached variable includes at least one of a TCP variable and an IP variable.

11. The computer-readable storage medium of claim 1 wherein one of the plurality of software layers is a TCP layer and wherein the delegated variable includes at least one of a current TCP state, a receive window size, a sequence number for next RECV, a maximum send window, a current congestion window, a maximum sequence number sent, and a sequence number for a next SEND.

12. The computer-readable storage medium of claim 1 wherein one of the plurality of software layers is a network layer and wherein the constant variable includes at least one of a destination IP address and a source IP address.

13. The computer-readable storage medium of claim 1 wherein one of the plurality of software layers is a network layer and wherein the cached variable includes the offload handle to a next layer.

14. The computer-readable storage medium of claim 1 wherein one of the plurality of software layers is a network layer and wherein the delegated variable includes an IP packet id start value, a local address, and a remote address.

15. The computer-readable storage medium of claim 1 wherein one of the plurality of software layers is a framing layer and wherein the cached variable includes an ARP address.

16. The computer-readable storage medium of claim 1 wherein one of the plurality of software layers is an IP security layer and wherein the constant variable includes at least one of a source port, a destination port, a protocol type, a local IP address, a remote IP address, and security association variables.

17. The computer-readable storage medium of claim 1 wherein one of the plurality of software layers is an IP security layer and wherein the cached variable includes at least one of a rekey on byte count, a stop on byte count, a rekey at a predefined tick, a stop at a predefined tick, and a maximum idle time for which a security association may be used.

18. The computer-readable storage medium of claim 1 wherein one of the plurality of software layers is an IP security layer and wherein the delegated variable includes at least one of a count of the bytes encrypted or decrypted with a security association, a remaining life time of the security association, and a remaining idle time of the security association.

19. The computer-readable storage medium of claim 1 wherein the first processor processes the cached variable and commands the second processor to update the cached variable when a variable in the cached state changes.

20. The computer-readable storage medium of claim 1 having further computer-executable instructions for the step comprising sending an update message to the second processor to update at least one cached variable.

21. The computer-readable storage medium of claim 20 having further computer-executable instructions for the step comprising adding a sequence number to the update message.

22. The computer-readable storage medium of claim 1 having further computer-executable instructions for the step comprising sending data through the plurality of software layers until an offload completion message is received such that the buffers are transferred to the second processor.

23. The computer-readable storage medium of claim 1 having further computer-executable instructions for the step comprising blocking additional offload requests for one of the plurality of software layers if a specific structure for the one of the plurality of software layers is being offloaded until the offload request is completed.

24. The computer-readable storage medium of claim 1 having further computer-executable instructions for the step comprising deciding, by at least one of the plurality of software layers, if the network stack state object will be offloaded.

25. The computer-readable storage medium of claim 1 having further computer-executable instructions for the step comprising determining if the offload request will be sent.

26. The computer-readable storage medium of claim 25 wherein the step of determining if the offload request will be sent includes at least one of:
selecting a specific service to be offloaded;
determining if one of a number of bytes and a number of packets associated with the network stack state object is consuming a significant amount of host resources;
determining if a policy requires that an offload occurs; and
determining if at least one of processor utilization, data cache use, page table cache use and memory bandwidth use is above a threshold.

27. The computer-readable storage medium of claim 1 having further computer-executable instructions for the step comprising assigning a portion of a total IP ID space to the second processor.

28. The computer-readable storage medium of claim 27 wherein the step of assigning the portion of the total IP ID space comprises the step of assigning approximately one half of the total IP ID space to the second processor.

29. The computer-readable storage medium of claim 28 having further computer-executable instructions for the step comprising generating an IP ID for a packet according to the equations:

$$Cur\_IPID = [(Start\_IPID\_For\_This\_Path) + (Counter\_For\_This\_Path) \bmod 32K] \bmod 64K$$
$$Counter\_For\_This\_Path = Counter\_For\_This\_Path + 1.$$

* * * * *